US009935797B1

(12) United States Patent
Lang et al.

(10) Patent No.: US 9,935,797 B1
(45) Date of Patent: Apr. 3, 2018

(54) ENCHANCED LINK 16 DETECTION WITH INTERFERENCE MITIGATION

(71) Applicant: BAE SYSTEMS Information and Electronic Systems Integration Inc., Nashua, NH (US)

(72) Inventors: James W Lang, Wayne, NJ (US); Michael J Berry, North Haledon, NJ (US); John H Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/479,890

(22) Filed: Apr. 5, 2017

(51) Int. Cl.
*H03D 1/04* (2006.01)
*H04L 25/08* (2006.01)
*H04L 27/26* (2006.01)
*H04W 72/06* (2009.01)

(52) U.S. Cl.
CPC .......... *H04L 25/08* (2013.01); *H04L 27/2663* (2013.01); *H04W 72/06* (2013.01)

(58) Field of Classification Search
CPC ..... H04L 27/2647; H04L 1/20; H04N 5/4401; H04B 1/30; H04B 1/28; H04B 1/1027; H04B 1/123; H04B 1/1036
USPC ........................................ 375/346, 316, 219
See application file for complete search history.

(56) References Cited

U.S. PATENT DOCUMENTS

| 6,779,009 | B1 * | 8/2004 | Zuber | G06F 17/15 |
| | | | | 708/422 |
| 7,020,701 | B1 | 3/2006 | Gelvin et al. | |
| 8,032,032 | B2 | 10/2011 | Chand et al. | |
| 8,995,902 | B2 | 3/2015 | Reiss | |
| 9,066,311 | B1 | 6/2015 | Sherman | |
| 2003/0058959 | A1 | 3/2003 | Rafie et al. | |
| 2030/0101034 | | 5/2003 | Tillotson | |
| 2004/0017824 | A1 | 1/2004 | Koenck et al. | |

(Continued)

OTHER PUBLICATIONS

International Search Report, PCT/US17/52242, ,dated Nov. 29, 2017, 11pages.

(Continued)

*Primary Examiner* — Zewdu Kassa
(74) *Attorney, Agent, or Firm* — Maine Cernota & Rardin (57) ABSTRACT

A method for implementing interference mitigation in wireless network such as a Link 16 network does not require interference recognition and does not degrade signal detection even in the absence of interference. An unmitigated correlation score is obtained by correlating received, unmitigated preamble symbols with expected symbols. At least one of the input signals is also correlated after mitigation to obtain a mitigated signal. A mitigated correlation sore is obtained from the mitigated signals, and a mixed correlation score is obtained by combining mitigated and unmitigated signals. A signal is detected if any of the correlation scores exceeds a corresponding threshold. Embodiments use the unmitigated correlation for subsequent message time of arrival determination if the unmitigated correlation score is above its detection threshold. In embodiments, mitigation is applied to only one of the message frequencies. Implementation of the disclosed method does not require excessive additional electronic resources.

19 Claims, 4 Drawing Sheets

(56) References Cited

U.S. PATENT DOCUMENTS

2010/0098036 A1 4/2010 Li
2016/0262151 A1 9/2016 Chongoushian

OTHER PUBLICATIONS

Northrup Grumman Corporation, Understanding Voice and Data Link Networking, Dec. 2014, Guidebook, Distributed by Northrup Grumman, 9326 Spectrum Center Blvd, San Diego, CA 92123-1433, Document No. 135-02-005, 320 pages.

* cited by examiner

ENCHANCED LINK 16 DETECTION WITH INTERFERENCE MITIGATION

STATEMENT OF GOVERNMENT INTEREST

The invention was made with United States Government support under Contract No. LLC/DLS-10-1058-0058 awarded by DATA LINK SOLUTIONS LLC. The United States Government has certain rights in this invention.

FIELD OF THE DISCLOSURE

The following disclosure relates generally to secure wireless network communications, and more particularly to methods for enhancing message detection in Link 16 wireless communication networks.

BACKGROUND

Link 16 is a widespread tactical wireless networking protocol that is used by front line land, air, and naval systems in the United States, NATO, and allied nations to allow multiple users to share situational awareness data. The protocol is based on an omnidirectional waveform that transmits information in pulses spaced 13 microseconds apart and distributed across 51 frequencies. The data is modulated on each pulse using Continuous Phase Shift Modulation ("CPSM") which is also a form of Minimum Shift Keying ("MSK"). Each pulse contains 32 symbols or "chips" of information, with each "chip" being 200 nanoseconds in length. According to the TDMA protocol, information is transmitted on a Link 16 network in timeslots that repeat every TDMA frame, or "epoch."

Messages transmitted on Link 16 networks are grouped in functional areas, and allocated to "Network Participation Groups" (NPGs), also sometimes referred to simply as Participation Groups (PGs). The use of NPGs allows the Link16 network to determine the amount of bandwidth to be allocated for each functional group for the network.

Figure 1:
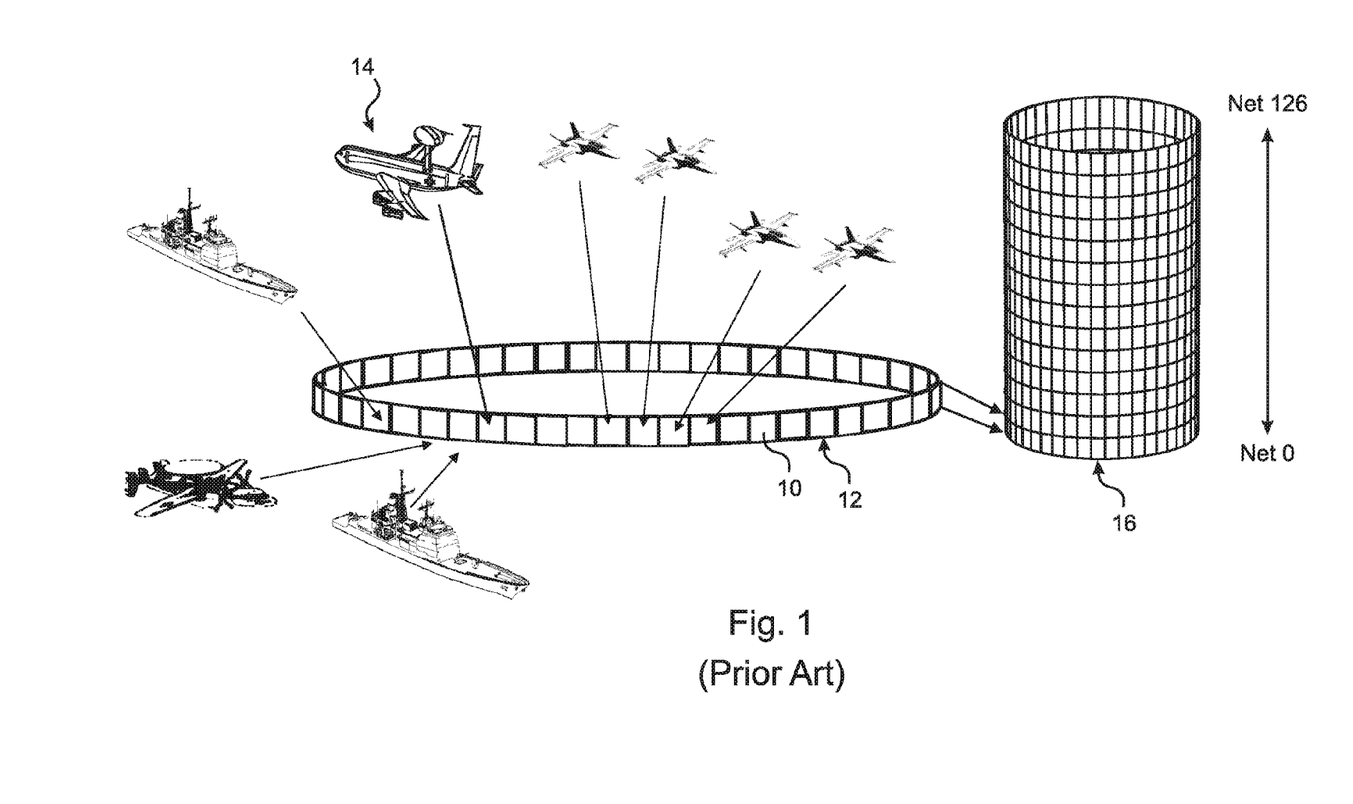
FIG. 1 is a graphical illustration of a typical Link 16 network architecture of the prior art.

A typical link 16 network is shown in FIG. 1. The blocks 10 in the ring 12 are time slots. Each participant 14 is provided transmit, receive, and relay time slot assignments by a network planner (not shown) prior to start of a mission. The column 16 to the right of the ring 12 illustrates the ability for Link 16 to operate on multiple nets (shown as stacked rings in the column 16). Each of the rings 12 in the column 16 can be replaced, allowing users to form subnetworks or sub-nets allowing them to exchange data using different CDMA and FDMA codes to expand the capability of the network. Details of the construction of these messages can be found in MIL-STD-6016, incorporated herein by reference in its entirety for all purposes.

In order for a Link 16 node to receive a message, it must detect a valid message preamble, which is the first 32 pulses of every Link 16 message. These first 32 pulses that comprise each message preamble are also referred to herein as "sync" pulses. A Link 16 preamble is transmitted on eight frequencies that are known to the receiver, with each frequency being used 4 times in a fixed order. The 32 chips of each preamble pulse are also known to the receiver. So as to determine if a valid message preamble has been received, a digital correlator is used to compare the known bits of each sync pulse with a demodulated bit stream of information from the receiver. The correlator outputs for each sync pulse are summed in a "Delay and Add Pipeline," and the sum is compared to a minimum detection threshold.

Once a valid preamble has been detected, the Link 16 receiver begins the process of data reception and correlation. The Link 16 digital signal processing is typically performed in a FPGA (Field Programmable Gate Array) device. It will be understood, however, that references to FPGA devices and resources made herein are intended to refer to any electronic resources that are used to implement Link 16 communications.

In addition to issues of background noise and signal strength, successful exchanges of messages over a Link 16 network can be further impeded by self-interference within the network due to multiple users transmitting in the same time slot, as well as by malicious interference jamming directed at the network by a hostile entity.

Figure 2A:
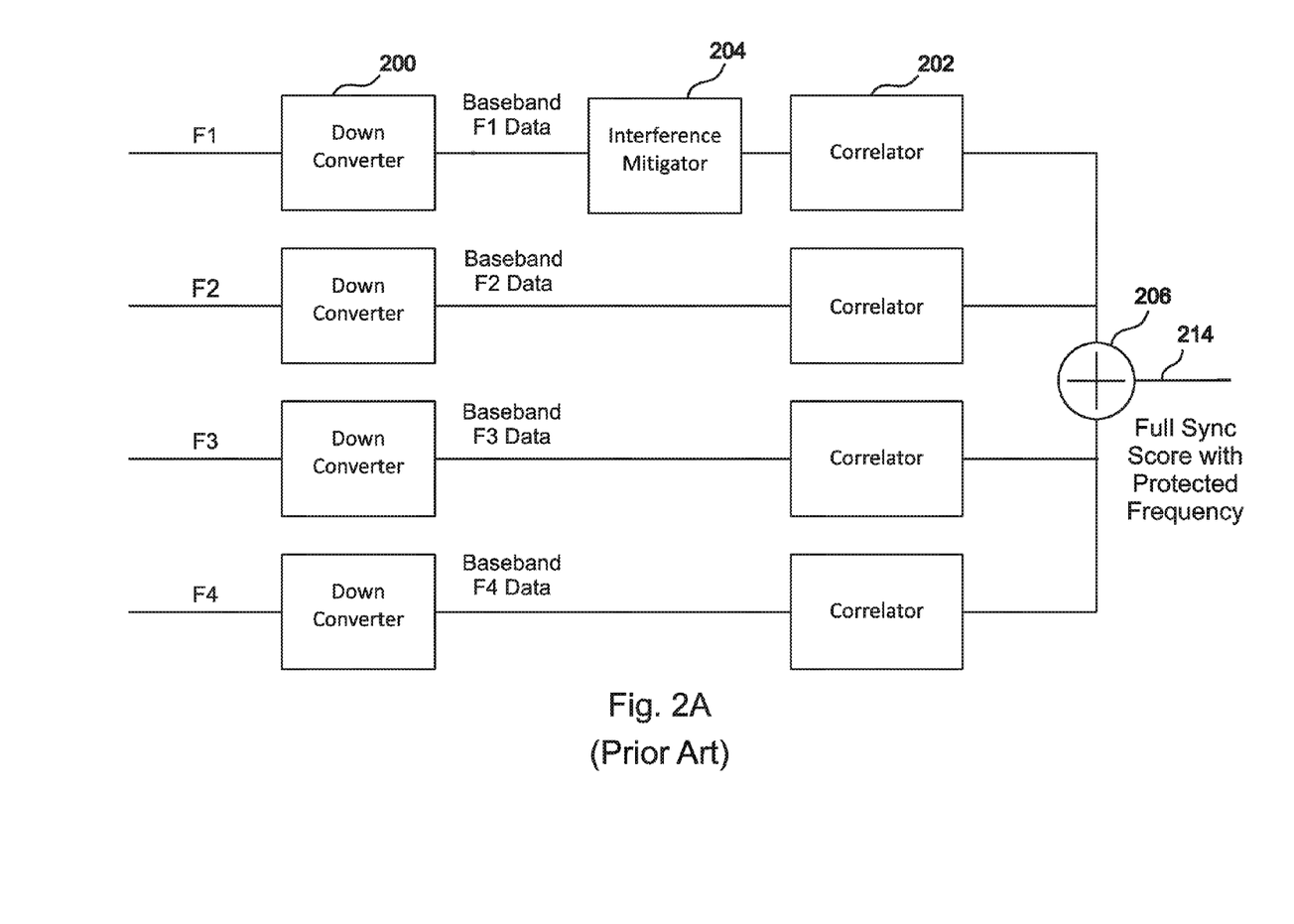
FIG. 2A is a functional block diagram of a Link 16 receiver of the prior art that includes interference mitigation on only one input channel.

Various digital signal processing techniques have been proposed to improve the performance of Link 16 by removing interference from the received signal before the correlation process. Due to the complexity of these interference mitigation techniques, and the resulting high demands on FPGA resources, the number of frequencies that can be simultaneously protected by these interference mitigation techniques is typically limited. This limits their effectiveness when applied to the preamble detection process. For example, in the Link 16 receiver of FIG. 2A, four input bit streams F1-F4 are demodulated by four down converters 200 and then analyzed by four correlators 202, but interference mitigation 204 is applied only to the first frequency channel, F1. The correlator outputs are then summed by a summer 206 and the resulting score 214 is compared with a minimum detection threshold.

In addition to the added demand for electronic resources, a common problem with these interference mitigation techniques is that under certain conditions they can actually degrade the performance of the detection process, especially when no actual interference is present.

One approach to solving this problem is to implement an interference recognizer to decide when to turn the mitigation technique on or off. However, such interference recognizers tend to require excessive additional FPGA resources, and do not always reliably detect the presence of interference.

What is needed, therefore, is a method for implementing interference mitigation in a Link 16 receiver that will not require excessive additional electronic resources, and will not degrade performance of the receiver when no interference is present.

SUMMARY

A method and system are disclosed for implementing interference mitigation in a Link 16 receiver without requiring excessive additional FPGA or other electronic resources, and without degrading performance of the receiver when no interference is present. The disclosed method provides for optimal Link 16 preamble detection when using interference mitigation techniques without the need for an interference recognizer.

According to the disclosed method, the message symbols received on the frequencies to which interference mitigation is applied are processed both with and without mitigation, and then are used in multiple Delay and Add pipelines for subsequent preamble detection. Precedence is given to the unmitigated sum in order to ensure that the baseline performance is not degraded. The additional FPGA resources required to implement the present method for preamble detection are not excessive. In embodiments, the interference mitigation techniques are applied to only a subset of the message transmission frequencies, and in some embodiments to only one of the message frequencies. Embodiments of the disclosed method are applicable to receivers having any number of input frequencies processed in the Delay and Add Pipeline, and for which the number of mitigated input frequencies ranges from only one to all of the input frequencies.

While the disclosure presented herein is made with reference to the specific example of a Link 16 network, it should be understood that the disclosed method is not limited to Link 16 networks, and is applicable to other networks and waveforms to which interference mitigation is applicable.

A first general aspect of the present disclosure is a method of enhanced message detection in a wireless network. The method includes receiving a plurality of input signals on a plurality of input channels; dividing the input signals into a first input group and a second input group, wherein each of the input groups includes at least one of the input signals, and each of the input signals is included in only one of the input groups; for each of the input signals in both of the input groups, correlating the input signal with a corresponding expected input and deriving therefrom an unmitigated correlation; combining the unmitigated correlations from the first and second input groups to obtain an unmitigated correlation score; for each input signal in the first input group, applying interference mitigation thereto to derive a mitigated input signal, correlating the mitigated input signal with the corresponding expected input, and deriving therefrom a mitigated correlation; combining the mitigated correlations to obtain a mitigated correlation score; combining the mitigated correlations with the unmitigated correlations from the second input group to obtain a mixed correlation score; comparing the unmitigated, mitigated, and mixed correlation scores with corresponding predetermined detection thresholds; and detecting a message if at least one of the correlation scores is above its corresponding detection threshold.

In embodiments, the wireless network is a Link 16 network, and the input channels are input frequencies.

Any of the above embodiments can further include down-converting to demodulate the input signals.

In any of the above embodiments of this general aspect, the first input group can include only one of the input signals. In some of these embodiments, deriving the mitigated correlation score includes designating the mitigated correlation of the input signal in the first input group as the mitigated correlation score.

In any of the above embodiments of this general aspect, the unmitigated correlation score can be given precedence over the mixed and mitigated correlation scores by using the unmitigated correlation for subsequent message time of arrival determination if the unmitigated correlation score is above its corresponding detection threshold. In some of these embodiments, the mitigated input signals are ignored when detecting the message if the unmitigated correlation score is above its corresponding detection threshold.

A second general aspect of the present disclosure is a wireless network receiver configured for enhanced detection of wireless network signals. The receiver includes an antenna for receiving a plurality of input signals on a plurality of input channels divided into a first channel group and a second channel group, wherein each of the channel groups includes at least one of the input channels, and each of the input channels is included in only one of the channel groups; a first signal correlator configured to correlate the input signals received on the channels of the first and second input channel groups with expected signals so as to obtain unmitigated correlations therefrom; a first combiner configured to combine the unmitigated correlations from the input signals received on the channels in the first and second channel groups so as to obtain an unmitigated correlation score; an interference mitigating unit configured to apply mitigation to each input signal received on a channel in the first channel group so as to obtain a mitigated input signal therefrom; a second signal correlator configured to correlate the mitigated input signals with expected signals to obtain mitigated correlations; a mitigation signal scoring unit configured to derive a mitigated correlation score from the mitigated correlations; a second signal combiner configured to combine the mitigated correlations with the unmitigated correlations of the input signals received on the channels of the second channel group so as to obtain a mixed correlation score; and a message detector configured to compare the unmitigated, mitigated, and mixed correlation scores with predetermined, corresponding detection thresholds, and to determine that a message has been detected if at least one of the correlation scores is above its corresponding detection threshold.

In embodiments of this general aspect, the receiver is configured to receive Link 16 wireless network signals, and the plurality of input channels are associated with a plurality of input frequencies.

Any of the above embodiments can further include a plurality of down converters configured to demodulate signals from each of the input channels.

In any of the above embodiments of this general aspect, only one of the input channels can be included in the first input channel group.

In any of the above embodiments of this general aspect, where one input signal is received on the input channel of the first input channel group, the mitigation signal scoring unit can be configured to designate the mitigated correlation of the input signal received on the input channel of the first input channel group as the first mitigated correlation score.

In any of the above embodiments of this general aspect, the message detector can be configured to give precedence to the unmitigated correlation score by using the unmitigated correlation for subsequent message time of arrival determination if the unmitigated correlation score is above its corresponding detection threshold. In some of these embodiments, the receiver is configured to ignore the mitigated input signals if the unmitigated correlation score is above its corresponding detection threshold.

A third general aspect of the present invention is a method of enhanced message detection in a wireless network. The method includes receiving a plurality of input signals on a plurality of input channels; correlating the input signals with corresponding expected inputs and deriving therefrom unmitigated correlations; combining the unmitigated correlations to obtain an unmitigated correlation score; for each input signal in a mitigation group comprising at least one of the input signals, applying interference mitigation thereto to derive a mitigated input signal, correlating the mitigated input signal with the corresponding expected input, and deriving therefrom a mitigated correlation; combining the mitigated correlations to obtain a mitigated correlation score; comparing the correlation scores with corresponding detection thresholds, and detecting a message if at least one of the correlation scores is above a corresponding detection threshold.

In embodiments of this general aspect, all of the input signals are included in the mitigation group. In other embodiments, the correlation scores further include a mixed correlation score obtained by combining the mitigated correlations with at least one unmitigated correlation that is derived from an input signal not included in the mitigation group.

And in any of the above embodiments of this general aspect, the unmitigated correlation score can be given precedence by using the unmitigated correlation for subsequent message time of arrival determination if the unmitigated correlation score is above its corresponding detection threshold. In some of these embodiments the mitigated input signals are ignored when detecting the message if the unmitigated correlation score is above its corresponding detection threshold.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Disclosed is a method of implementing interference mitigation in a Link 16 network without requiring excessive additional FPGA or other electronic resources. The disclosed method provides for optimal Link 16 preamble detection when using interference mitigation techniques even when no interference is present and without need for an interference recognizer.

According to the disclosed method, the message preamble pulses received on the frequencies to which interference mitigation is applied are processed both with and without mitigation, and then are used in multiple Delay and Add pipelines for subsequent preamble detection. Precedence is given to the unmitigated sum in order to ensure that the baseline performance is not degraded.

The additional FPGA resources required to implement the present method for preamble detection are not excessive. In embodiments, the interference mitigation techniques are applied to only a subset of the message transmission frequencies, and in some embodiments to only one of the message transmission frequencies. The disclosed method can easily be applied to situations with more or less frequencies being processed in the Delay and Add Pipeline and/or with fewer or more frequencies having interference mitigation. When the disclosed method is applied to a Link 16 network, eight is the maximum number of frequencies that can be processed, since a Link 16 preamble is transmitted using only eight frequencies.

Figure 2B:
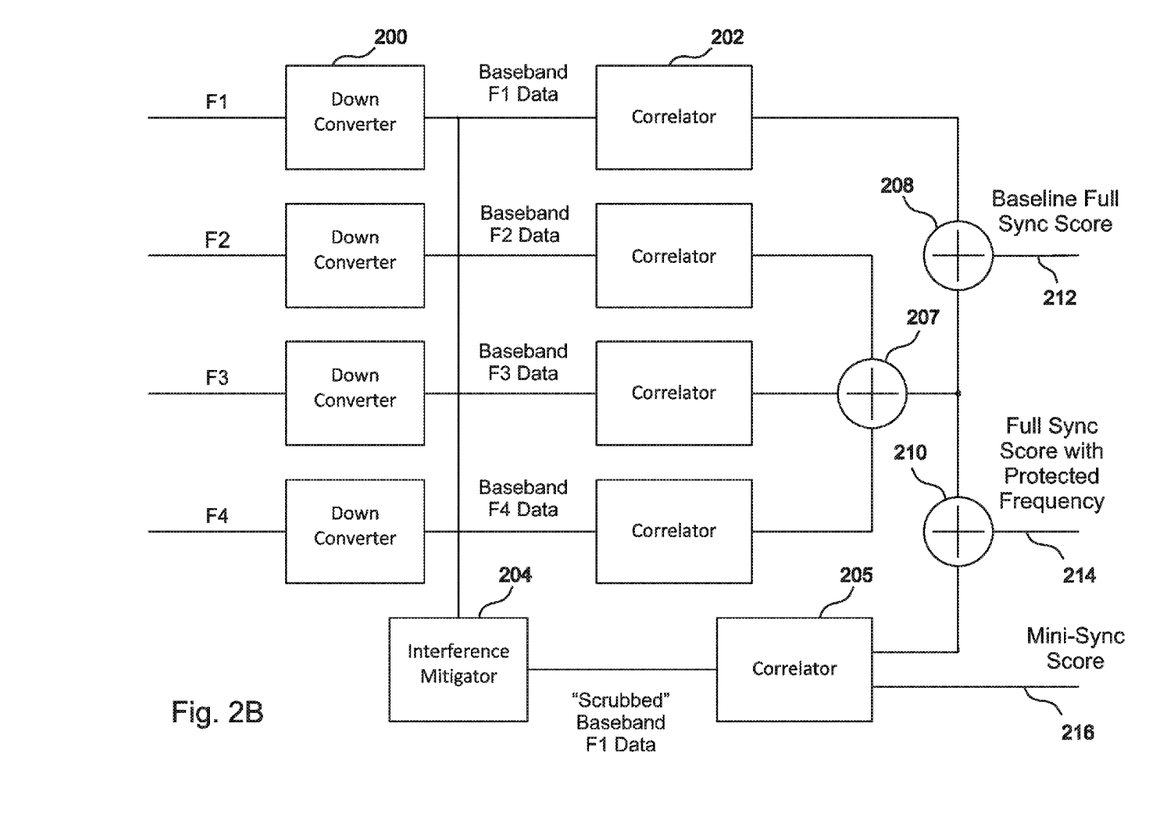
FIG. 2B is a functional block diagram of a Link 16 receiver in an embodiment of the present disclosure that includes interference mitigation on only one input channel and provides three sync pipelines for use in determining whether a valid sync pulse and preamble have been detected.

FIG. 2B is a functional block diagram that illustrates the disclosed preamble detection method in an embodiment where signals are analyzed by correlators 202 on four of the eight Link 16 frequency channels, designated as F1 through F4, and where interference mitigation 204 is applied only to the first frequency channel, F1. Note that each correlator (202 and 205) in FIG. 2B is comprised of four identical individual sub-correlators for each of the four Link 16 pulses transmitted on a given preamble frequency. For clarity, the associated delay elements required to properly form the Delay and Add Pipeline are not shown in FIG. 2A or 2B.

According to the embodiment of FIG. 2B, after the four input bit streams F1-F4 are demodulated by down converters 200, they are each compared without mitigation by a correlator section 202 with the sequence of bits that are known to be included in a valid preamble. In addition, interference mitigation 204 is applied to one of the bit streams, referred to herein arbitrarily and for convenience as the "first" demodulated bit stream F1, and the interference mitigated output is provided to an additional interference mitigator correlator 205, which in embodiments is identical to the other correlators 202.

The correlator outputs are then summed in three different combinations 207, 208, 210 to produce three detection outputs or "sync pipelines" 212, 214, 216 whereby the three correlator outputs for channels F2-F4 are summed 207 in a preliminary step, and then that partial sum is combined 208 with the unmitigated correlator output for F1 to provide a first, baseline sync pipeline 212. The partial sum of correlator outputs for channels F2-F4 207 is also combined 210 with the correlator output for the mitigated F1 channel 205 to produce a second sync pipeline 214. Finally, the output of the mitigated F1 correlator is taken separately as a third, "mini-sync" pipeline 216.

Accordingly, in the embodiment of FIG. 2B, three sync pipelines 212, 214, 216 are used for detection of a valid preamble. The first 212, or "baseline" full sync pipeline that includes the sum of all 4 unmitigated frequency channel correlations (i.e. a sum of 16 pulses) represents the full correlation result without implementation of interference mitigation. In embodiments, an above-threshold result on this baseline sync pipeline 212 is given precedence, such that if the baseline sync pipeline 212 result is above its designated minimum threshold, this is taken to indicate successful detection of a valid preamble, regardless of the other sync pipeline results 214, 216. This approach guarantees that the performance of the Link 16 receiver cannot be degraded by inclusion of interference mitigation, for example when no interference is present.

The two additional sync pipelines 214, 216 are used for enhanced detection of a valid preamble when interference (e.g. jamming) is present. The second sync pipeline 214 has the advantage of including more data, i.e. all four of the received bit streams, in the correlation, and may provide the best detection results when the signal is limited by both signal strength and interference.

The third, mini-sync pipeline 216 has the advantage that no un-mitigated information is included in the correlation. Therefore, the mini sync pipeline 216 includes only correlation scores from the protected pulses in a jamming environment. By applying an appropriately reduced detection threshold to this mini-sync pipeline 216, it can remain possible to detect a valid preamble even when most or all of the received pulses are jammed by malicious interference.

The disclosed method does not require excessive additional FPGA or other electronic resources. For example, if the embodiment of FIG. 2B, where the mitigation technique 204 is only applied to the first frequency channel F1, is compared with the prior art receiver of FIG. 2A, the additional sync pipelines 212, 216 of the disclosed method require only four additional sub-correlator elements for F1 (collectively included in 205), plus additional delay elements and adders used for additional summing 208, 210. For a typical two antenna Link-16 configuration, 8 additional sub-correlators are needed to add the additional sync pipelines 214, 216.

In embodiments, a valid preamble is detected whenever any one of the three sync pipeline outputs 212, 214, 216 exceeds its corresponding detection threshold. However, in embodiments such as FIG. 2B, the unmitigated full sync pipeline 212 is given precedence, guaranteeing that performance would always be at least equal to the baseline.

Figure 3:
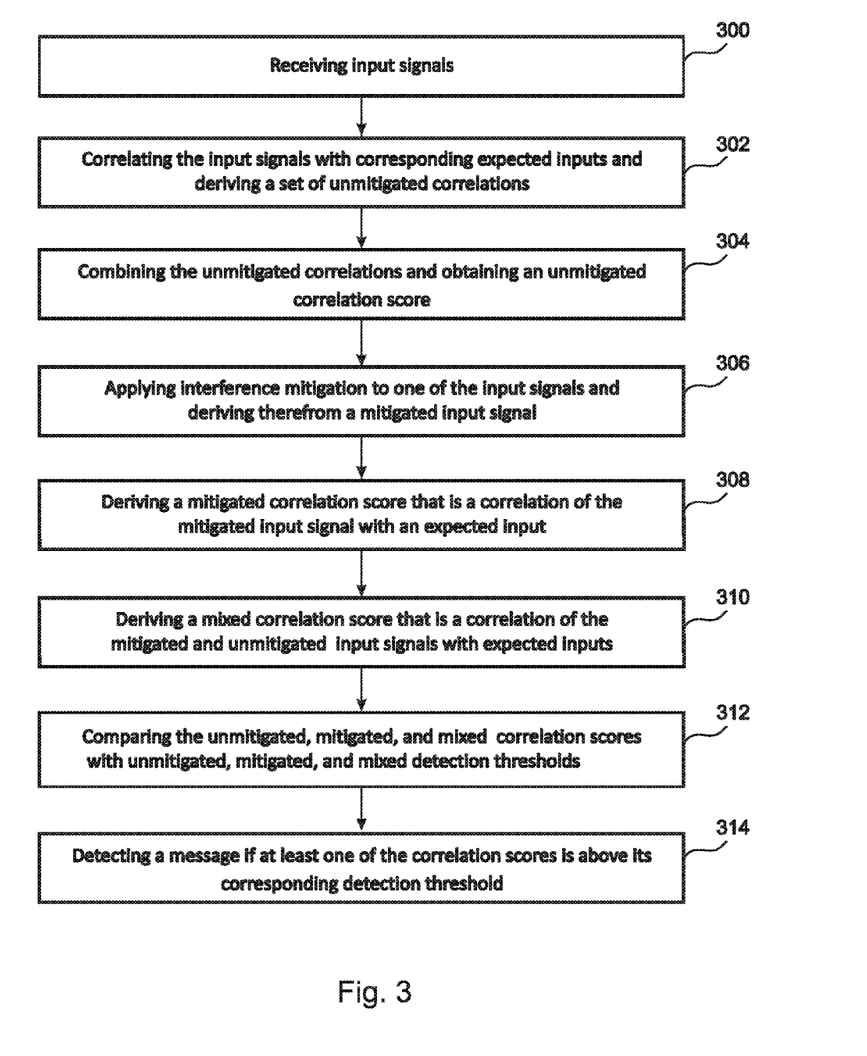
FIG. 3 is a flow chart illustrating a method of operation according to one embodiment of the present disclosure.

An embodiment of the disclosed process is illustrated by the flow chart presented in FIG. 3. Input signals are received for processing 300. In some embodiments an antenna unit is used to receive the input signals, while in other embodiments the receiver or processor obtains the signals by other wired or wireless means, depending upon the application. In various embodiments the received input signals are subjected to certain pre-processing steps that are typical of a receiver unit, such as amplification, filtering and/or conversion.

The input signals are correlated 302 with corresponding expected input signals that in some embodiments are stored in memory and represent a priori information. A set of unmitigated correlations are derived from the correlation processing 302 by comparing the 32 chips of each received preamble with their expected values and computing a correlation score proportional to the number of agreements.

The unmitigated correlations are then combined in a Delay and Add pipeline and an unmitigated correlation score 212 is derived therefrom 304.

Interference mitigation is applied to at least one of the unmitigated input signals so as to obtain a corresponding mitigated signal 306. In the example of FIG. 3, the mitigation is applied to only one of the input signals. In similar embodiments, interference mitigation is applied to more than one of the unmitigated input signals.

A mitigated correlation score is determined 308, which is a correlation of the mitigated input signal with an expected input. In the embodiment of FIG. 3, the mitigated correlation score is determined by comparing the 32 pulses of each received preamble with their expected values and computing a correlation score 216 proportional to the number of agreements.

The set of mitigated correlations 205 are also combined 210 with a subset 207 of the unmitigated correlations to form a third "mixed" correlation score 214. This is done by replacing the first unmitigated correlation scores with the mitigated scores 310.

The three correlation scores (unmitigated 212, mitigated 216, and mixed 214) are then compared to three independent thresholds 312. Typically, the threshold is the same for the unmitigated 212 and mixed scores 214, since they are derived from an equal number of processed sync pulses. The threshold for the mitigated score 216 is lowered appropriately to account for the reduced number of processed sync pulses in its sum. Based on these comparisons, a message is detected as valid or authorized 314 when at least one of the correlation scores is higher than the corresponding detection thresholds.

If more than one of the thresholds is simultaneously exceeded, precedence is given to the unmitigated correlation score by using the unmitigated correlation for subsequent message time of arrival determination. Thresholds are fixed and determined a priori by system false alarm (exceeding the threshold when no signal is present) requirements. If none of the correlation sums exceed their threshold in a given Link 16 time slot, the received message is discarded and the process repeats in the next time slot.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method of enhanced message detection in a wireless network, the method comprising:
   receiving a plurality of input signals on a plurality of input channels;
   dividing the input signals into a first input group and a second input group, wherein each of the input groups includes at least one of the input signals, and each of the input signals is included in only one of the input groups;

for each of the input signals in both of the input groups, correlating the input signal with a corresponding expected input and deriving therefrom an unmitigated correlation;

combining the unmitigated correlations from the first and second input groups to obtain an unmitigated correlation score;

for each input signal in the first input group, applying interference mitigation thereto to derive a mitigated input signal, correlating the mitigated input signal with the corresponding expected input, and deriving therefrom a mitigated correlation;

combining the mitigated correlations to obtain a mitigated correlation score;

combining the mitigated correlations with the unmitigated correlations from the second input group to obtain a mixed correlation score;

comparing the unmitigated, mitigated, and mixed correlation scores with corresponding predetermined detection thresholds; and detecting a message if at least one of the correlation scores is above its corresponding detection threshold.

2. The method of claim 1, wherein the wireless network is a Link 16 network, and the input channels are input frequencies.

3. The method of claim 1, further comprising down-converting to demodulate the input signals.

4. The method of claim 1, wherein the first input group includes only one of the input signals.

5. The method of claim 4, wherein deriving the mitigated correlation score includes designating the mitigated correlation of the input signal in the first input group as the mitigated correlation score.

6. The method of claim 1, wherein the unmitigated correlation score is given precedence over the mixed and mitigated correlation scores by using the unmitigated correlation for subsequent message time of arrival determination if the unmitigated correlation score is above its corresponding detection threshold.

7. The method of claim 6, wherein the mitigated input signals are ignored when detecting the message if the unmitigated correlation score is above its corresponding detection threshold.

8. A wireless network receiver configured for enhanced detection of wireless network signals, the receiver comprising:

an antenna for receiving a plurality of input signals on a plurality of input channels divided into a first channel group and a second channel group, wherein each of the channel groups includes at least one of the input channels, and each of the input channels is included in only one of the channel groups;

a first signal correlator configured to correlate the input signals received on the channels of the first and second channel groups with expected signals so as to obtain unmitigated correlations therefrom;

a first combiner configured to combine the unmitigated correlations from the input signals received on the channels in the first and second channel groups so as to obtain an unmitigated correlation score;

an interference mitigating unit configured to apply mitigation to each input signal received on a channel in the first channel group so as to obtain a mitigated input signal therefrom;

a second signal correlator configured to correlate the mitigated input signals with expected signals to obtain mitigated correlations;

a mitigation signal scoring unit configured to derive a mitigated correlation score from the mitigated correlations;

a second signal combiner configured to combine the mitigated correlations with the unmitigated correlations of the input signals received on the channels of the second channel group so as to obtain a mixed correlation score; and a message detector configured to compare the unmitigated, mitigated, and mixed correlation scores with predetermined, corresponding detection thresholds, and to determine that a message has been detected if at least one of the correlation scores is above its corresponding detection threshold.

9. The receiver of claim 8, wherein the receiver is configured to receive Link 16 wireless network signals, and the plurality of input channels are associated with a plurality of input frequencies.

10. The receiver of claim 8, further comprising a plurality of down converters configured to demodulate signals from each of the input channels.

11. The receiver of claim 8, wherein only one of the input channels is included in the first input channel group.

12. The receiver of claim 8, wherein only one input signal is received on the input channel of the first input channel group, and the mitigation signal scoring unit is configured to designate the mitigated correlation of the input signal received on the input channel of the first input channel group as the first mitigated correlation score.

13. The receiver of claim 8, wherein the message detector is configured to give precedence to the unmitigated correlation score by using the unmitigated correlation for subsequent message time of arrival determination if the unmitigated correlation score is above its corresponding detection threshold.

14. The receiver of claim 13, wherein the receiver is configured to ignore the mitigated input signals if the unmitigated correlation score is above its corresponding detection threshold.

15. A method of enhanced message detection in a wireless network, the method comprising:

receiving a plurality of input signals on a plurality of input channels;

correlating the input signals with corresponding expected inputs and deriving therefrom unmitigated correlations;

combining the unmitigated correlations to obtain an unmitigated correlation score;

for each input signal in a mitigation group comprising at least one of the input signals, applying interference mitigation thereto to derive a mitigated input signal, correlating the mitigated input signal with the corresponding expected input, and deriving therefrom a mitigated correlation;

combining the mitigated correlations to obtain a mitigated correlation score;

comparing the correlation scores with corresponding detection thresholds, and detecting a message if at least one of the correlation scores is above a corresponding detection threshold.

16. The method of claim 15, wherein all of the input signals are included in the mitigation group.

17. The method of claim 15, wherein the correlation scores further include a mixed correlation score obtained by combining the mitigated correlations with at least one unmitigated correlation that is derived from an input signal not included in the mitigation group.

18. The method of claim 15, wherein the unmitigated correlation score is given precedence by using the unmitigated correlation for subsequent message time of arrival determination if the unmitigated correlation score is above its corresponding detection threshold.

19. The method of claim 18, wherein the mitigated input signals are ignored when detecting the message if the unmitigated correlation score is above its corresponding detection threshold.

\* \* \* \* \*